US011498226B2

(12) United States Patent
Weitschat et al.

(10) Patent No.: US 11,498,226 B2
(45) Date of Patent: Nov. 15, 2022

(54) PROTECTIVE DEVICE FOR AN EFFECTOR OF A MANIPULATOR, DEVICE FOR MANIPULATING WORKPIECES, AND A METHOD FOR ACTUATING A DEVICE FOR MANIPULATING WORKPIECES

(71) Applicant: Deutsches Zentrum für Luft- und Raumfahrt e.V., Cologne (DE)

(72) Inventors: Roman Weitschat, Munich (DE); Hannes Höppner, Munich (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 827 days.

(21) Appl. No.: 16/085,783

(22) PCT Filed: Mar. 16, 2017

(86) PCT No.: PCT/EP2017/056295
§ 371 (c)(1),
(2) Date: Sep. 17, 2018

(87) PCT Pub. No.: WO2017/158120
PCT Pub. Date: Sep. 21, 2017

(65) Prior Publication Data
US 2019/0047160 A1 Feb. 14, 2019

(30) Foreign Application Priority Data
Mar. 17, 2016 (DE) .................... 10 2016 104 940.9

(51) Int. Cl.
*B25J 19/00* (2006.01)
*B25J 15/00* (2006.01)
*B25J 19/06* (2006.01)

(52) U.S. Cl.
CPC .......... *B25J 19/0075* (2013.01); *B25J 15/00* (2013.01); *B25J 19/0091* (2013.01); *B25J 19/06* (2013.01)

(58) Field of Classification Search
CPC .............. B23Q 11/081; B23Q 11/0816; B25J 19/0075; B25J 19/06; B25J 15/00
See application file for complete search history.

(56) References Cited

U.S. PATENT DOCUMENTS 3,499,641 A * 3/1970 Peterson .............. B23Q 11/006
269/22
3,800,890 A * 4/1974 Gyongyosi ........... E21B 21/015
175/209
(Continued)

FOREIGN PATENT DOCUMENTS

CN 204658463 U 9/2015
DE 9208980 U1 11/1993
(Continued)

OTHER PUBLICATIONS

European Patent Office; Search Report in related International Patent Application No. PCT/EP2017/056295 dated Jun. 6, 2017; 4 pages.
(Continued)

*Primary Examiner* — William C Joyce
(74) *Attorney, Agent, or Firm* — Dorton & Willis, LLP

(57) ABSTRACT

A protective device for an effector of a manipulator includes a shell having a plurality of chambers, wherein the shell is flexurally slack and bounds a fillable and/or evacuable pressure space. The protective device further includes at least one first pulling means for pulling back the shell, and at least one actuator for applying a tensile force to the at least one first pulling means. A device for manipulating work-
(Continued)

pieces includes a robotic manipulator having an effector, and the protective device disposed proximate the effector.

14 Claims, 3 Drawing Sheets

(56) References Cited

U.S. PATENT DOCUMENTS

| | | | | |
|---|---|---|---|---|
| 4,030,615 | A * | 6/1977 | Guggi | B25J 1/08 414/8 |
| 4,523,100 | A * | 6/1985 | Payne | B25J 19/022 901/41 |
| 5,653,561 | A * | 8/1997 | May | B23Q 11/0046 408/67 |
| 7,322,429 | B2 * | 1/2008 | Kim | B23B 49/008 173/171 |
| 8,529,170 | B2 * | 9/2013 | Everington, Jr. | B23Q 11/0046 408/67 |
| 10,328,530 | B2 * | 6/2019 | Krajca | B23K 37/006 |
| 2003/0160520 | A1 | 8/2003 | Gloden | |
| 2015/0158178 | A1 | 6/2015 | Burmeister et al. | |
| 2015/0174771 | A1 | 6/2015 | Fujita | |
| 2015/0352720 | A1 | 12/2015 | Iizuka | |

FOREIGN PATENT DOCUMENTS

| | | |
|---|---|---|
| DE | 10391972 T5 | 1/2005 |
| DE | 102006044071 A1 | 4/2008 |
| DE | 102007062245 A1 | 6/2009 |
| DE | 102008019021 A1 | 10/2009 |
| DE | 102012007242 A1 | 9/2013 |
| DE | 102012217764 A1 | 6/2014 |
| DE | 202013105501 U1 | 3/2015 |
| DE | 102013020137 A1 | 6/2015 |
| DE | 102014019033 A1 | 6/2015 |
| DE | 102015005799 A1 | 12/2015 |
| DE | 102014221645 A1 | 4/2016 |
| EP | 1566246 A1 | 8/2005 |
| EP | 1810795 A1 | 7/2007 |
| JP | 09-285992 * | 11/1997 |
| JP | H09285992 A | 11/1997 |
| JP | S6339786 A | 2/1998 |
| WO | 2014008929 A1 | 1/2014 |

OTHER PUBLICATIONS

German Patent Office; Search Report in related German Patent Application No. 10 2016 104 940.9 dated Jan. 24, 2017; 9 pages.
European Patent Office; Written Opinion in related International Patent Application No. PCT/ep2017/056295 dated Jun. 2, 2017; 7 pages.

* cited by examiner

PROTECTIVE DEVICE FOR AN EFFECTOR OF A MANIPULATOR, DEVICE FOR MANIPULATING WORKPIECES, AND A METHOD FOR ACTUATING A DEVICE FOR MANIPULATING WORKPIECES

CROSS-REFERENCE TO RELATED APPLICATIONS

This application is a national phase application under 35 U.S.C. § 371 of International Patent Application No. PCT/EP2017/056295, filed Mar. 16, 2017 (pending), which claims the benefit of German Patent Application No. DE 10 2016 104 940.9, filed Mar. 17, 2016, the disclosures of which are incorporated by reference herein in their entirety.

TECHNICAL FIELD

The invention relates to a protective device for an effector of a manipulator, wherein the protective device has a shell. In addition, the invention relates to a protective device for an effector of a manipulator, wherein the protective device has a flexurally slack shell, and the shell bounds a fillable and/or evacuable pressure space. In addition, the invention relates to a device for manipulating workpieces, the device having a manipulator with an effector. In addition, the invention relates to a method for actuating a device of this type.

BACKGROUND

A monitoring system is known from DE 10 2012 007 242 A1 for ensuring a safe cooperation between at least one worker and at least one robot in a human-robot system of cooperation, which includes the at least one robot and at least one workstation for the at least one worker, wherein the monitoring system comprises: a detection unit for detecting a position of the worker and/or a movement behavior of at least one body part of the worker; at least one monitoring sensor to determine and monitor at least one danger area around the robot in which the presence of the worker is not allowed or allowed only to a limited extent, and/or to determine and monitor at least one boundary of the danger area and to detect at least violation of the area by the worker and/or the robot into and/or out of the danger area; and a control unit for processing the detected position and/or the detected movement behavior and optionally the detected violation of the area, and to control the robot as a function of the detected position and/or the detected movement behavior and, if necessary, the detected violation of the area.

A method for controlling a robot is known from WO 2014/008929 A1, which is designed to be operated in a working mode, in which a part of the robot is moved at a velocity at which there is a risk of injury to a person, if the person collides with the part, wherein the working mode is deactivated if a safety device detects that the person has entered an action region of the displaceable part, comprising the steps: a sensor unit of the safety device determines a position and a posture of the person while the person is outside of the action region of the part; a prediction unit of the safety device determines an action area of the person, which is defined by locations which are predictably accessible by the person from the determined posture within a predefined time interval; a collision monitoring unit of the safety device monitors whether the action area of the person and the action area of the displaceable part overlap, and, if necessary, the robot is switched from the working mode into a safety mode, in which the velocity of the part is reduced and/or the part is guided past the person to prevent injury to the person.

An industrial robot is known from DE 10 2014 019 033 A1 which works together with a person and which has a base unit and a movable unit which is movably provided on or above the base unit, wherein the robot comprises: a protective element made of a material with a rigidity which is lower than the rigidity of the base unit and the movable unit, wherein the protective element covers a periphery of at least the movable unit of the base unit and the movable unit; and a detection means which is provided at least on the base unit or the movable unit to detect an external force which is input through the protective element.

A robot is known from DE 10 2006 044 071 A1 with a manipulator unit and a robot protective device which surrounds the manipulator unit at least partially, wherein the volume of the protective device may be changed by supplying or draining a fluid in order to adjust to the working conditions and/or to damp an impact. The protective device may have a compressible plastic material and elastically damp a collision. The protective device may be surrounded by fastening means which have elastic bands. The protective device may have a pressure sensor to detect a pressure change of the fluid.

SUMMARY

The underlying object of the invention is to structurally and/or functionally improve protective devices of the type listed at the outset. In addition, the underlying object of the invention is to structurally and/or functionally improve a device of the type listed at the outset. In addition, the underlying object of the invention is to improve the methods listed at the outset.

The object is solved by a protective device and method in accordance with the present disclosure.

The protective device may function to protect an effector and/or to protect from an effector. The protective device may function to protect from an effector, and to protect a workpiece located on the effector, and/or to protect from an effector and from a workpiece located on the effector. The protective device may function to protect people. The effector may function for handling, mounting, and/or processing workpieces. The effector may be a gripper.

The chambers may be separated fluid-tight from one another individually and/or in groups. Chambers separated fluid-tight from one another individually and/or in groups may form pressure spaces. The chambers may be fluid-permeably connected to one another in a communicative way between groups. Fluid-tight partitions may be arranged between the chambers. The chambers may be exchangeable individually or in groups. The chambers may be repairable individually or in groups.

The user interface may function for information output. The user interface may function for information output to an operating person. Information may be control information. Information may relate to whether a workpiece is gripped or not gripped. Information may relate to a safety status. Information may relate to a fault. Information may relate to a required interaction.

The user interface may have a light module. The light module may function for status projection. The light module may have at least one lighting means. The at least one lighting means may be an LED. The light module may have an electric/electronic control unit. The light module may have at least one electrical power input. The light module may have at least one electric energy store. The light module may have at least one electric signal input. The light module may have at least one electric signal output. The light module may have at least one lens.

The shell may be illuminable at least in sections with the aid of the light module. The light module may be arranged inside of the shell. The light module may be arranged internally on the shell. The shell may be internally illuminable with the aid of the light module. The light module may be arranged outside of the shell. The light module may be arranged externally on the shell. The shell may be externally illuminable with the aid of the light module.

With the aid of the light module, different colors of light may be producible. With the aid of the light module, changing colors of light may be producible. With the aid of the light module, red, blue, and/or yellow light may be producible. With the aid of the light module, colors mixed from red, blue, and/or yellow light may be producible. With the aid of the light module, temporary light patterns may be producible. With the aid of the light module, flashing and/or continuous light may be producible. With the aid of the light module, communication symbols may be displayed. Communication symbols may be graphics and/or images.

The shell may be transparent or translucent at least in sections.

The user interface may function for information input. The user interface may function for information input at the protective device. The user interface may function for information input at the device for manipulating workpieces.

The user interface may have a keypad, a touchpad, and/or a touchscreen. The keypad, the touchpad, and/or the touchscreen may be arranged on the outside on the shell. The keypad, the touchpad, and/or the touchscreen may be fixedly connected to the shell. The keypad, the touchpad, and/or the touchscreen may be flexible. The keypad, the touchpad, and/or the touchscreen may be flexural. The keypad, the touchpad, and/or the touchscreen may be foldable. The keypad, the touchpad, and/or the touchscreen may have multiple input sections. The keypad, the touchpad, and/or the touchscreen may have articulations. The keypad, the touchpad, and/or the touchscreen may have symbols, numerals, and/or letters.

The protective device may have a flexurally slack shell. The shell may bound at least one fillable and/or evacuable pressure space.

The shell may have a low modulus of elasticity. The shell may have a low tensile rigidity. The shell may be highly malleable in the case of force or torsional load. The shell may be produced from a textile material. The shell may be produced from a woven textile. The shell may be produced from polyamide. The shell may have an interior side. The inner side may face the pressure space. The shell may have an exterior side.

The pressure space may be fillable with a gas, in particular air. The pressure space may be at least approximately gas-tight, in particular airtight. The shell may be inflatable. Gas, in particular air, may be evacuable from the pressure space. The pressure space may have at least one inlet. The pressure space may have at least one outlet. The pressure space may have at least one combined inlet/outlet.

The protective device may have an application module for filling and/or evacuating the pressure space. The application module may have a pressure generation device. The pressure generation device may function for generating excess pressure and/or negative pressure. The application module may have a pump, in particular a reciprocating piston pump. The pump may be operable in a pressure mode and/or in a suction mode. The application module may have at least one valve. The at least one valve may be electrically, electromotively, electromagnetically, and/or pneumatically actuable. The application module may have a control unit for controlling the at least one valve. The control unit may be an electric control unit.

The shell may be elastic at least in sections. The shell may be rubber-elastic at least in sections. The shell may have a predetermined elasticity at least in sections. The shell may have at least one section with a higher elasticity and at least one section with a lower elasticity. The shell may be reinforced at least in sections. The shell may have at least one reinforcing element. The at least one reinforcing element may be produced from a plastic material, from a metal, from leather, and/or from any other reinforcing material. The at least one reinforcing element may have a plate-like shape. The at least one reinforcing element may have a shell-like shape. The at least one reinforcing element may be arranged at a predetermined point. The at least one reinforcing element may be arranged on an interior side of the shell.

The shell may have a double-walled shape when the pressure space is filled. The filled pressure space may have an annular cross section. The shell may have a hood-like shape when the pressure space is filled. The shell may have a tub-like shape when the pressure space is filled. The shell may have a round cup-like shape when the pressure space is evacuated. The shell may have one fixed end section and one free end section. The shell may be produced from one part. The shell may have multiple parts connected to one another.

The shell may have a foldable honeycomb structure. The shell may be produced at least in sections from wood pulp, cellulose, semichemical pulp, and/or waste paper. The shell may be produced at least in sections from paper or cardboard.

The at least one first pulling means may function to transfer tensile forces. The at least one first pulling means may have a low elasticity. The at least one first pulling means may have a high-tensile connection at one end to the shell.

The at least one actuator may have a piston-cylinder arrangement. The at least one actuator may be pneumatically actuable. The at least one actuator may be electromotively or electromagnetically actuable. The at least one first pulling means may have a high-tensile connection at one end to the at least one actuator.

The at least one first pulling means may be elastic at least in sections. The at least one first pulling means may be spring elastic at least in sections. The at least one first pulling means may be rubber elastic at least in sections. The at least one first pulling means may be designed as an electro-active polymer at least in sections.

The protective device may have at least one second pulling means in order to stabilize the shell in a spatially predetermined shape when the pressure space is filled. The at least one second pulling means may function to transfer tensile forces. The at least one second pulling means may have a low elasticity. The at least one second pulling means may a predetermined length. The at least one second pulling means may have a high-tensile connection at both ends to the shell.

The protective device may have at least one pressure sensor to detect a pressure in the pressure space. The at least one pressure sensor may be connected in a signal-conducting way to the control unit for controlling the at least one valve.

The protective device may have a fastening module and a shell. The fastening module may also be designated as a flange or an airbag flange. The shell may also be designated as an airbag. The fastening module and the shell may be detachably connected to one another in a non-destructive way. The fastening module and the shell may be connected to one another with the aid of a quick-change coupling. The fastening module and the shell may be connected to one another with the aid of a screw connection. The fastening module and the shell may be connected to one another with the aid of a bayonet connection. The fastening module and the shell may be connected to one another air tight. The fastening module may have an annular shape. The fastening module may function for the fixed arrangement on a manipulator, in particular at a connection area for an effector. The light module may be arranged on the fastening module.

The device may be an industrial robot. The device may have an electric/electronic control unit. The control unit for the device and the control unit for the light module may be connected to one another in a signal-conducting way. The manipulator may have at least one arm section. The manipulator may have at least one articulation. The manipulator may be displaceable. The manipulator may be programmed to be displaceable. The manipulator may be a robot arm. The manipulator may be an arm of an industrial robot. The manipulator may have a free end. A connection section for the effector may be arranged on the free end of the manipulator. The effector may have a corresponding connection section. The manipulator and the effector may be connected to one another in a connection area. The manipulator may have torque sensors. Signals from the torque sensors may be provided to the protective device.

The protective device may be arranged at the connection area. The protective device may be arranged on the effector on the connection area side. When the pressure space is filled, the shell may at least approximately completely surround the effector. When the pressure space is filled, the shell may at least laterally surround the effector. When the pressure space is filled, the shell may surround the effector like a hood. When the pressure space is filled, the shell may form a protective space, open on one side, for the effector.

Predetermined minimum radii may be maintained at the effector. Predetermined minimum radii may be maintained at the effector to prevent damage to the shell.

The pressure space may be filled to inflate the shell. The pressure space may be evacuated to retract the shell. The at least one first pulling means may be released when a manipulation of a workpiece is not scheduled. A tensile force may be applied to the at least one first pulling means with the aid of an actuator, when a manipulation of a workpiece is scheduled. A tensile force may be applied to the at least one first pulling means to support the retraction of the shell.

A pressure may be detected in the pressure space to control a pressure in the pressure space. The pressure space may be further filled if a predetermined pressure value is not yet reached. Filling the pressure space may be ended when a predetermined pressure value is reached. When a predetermined pressure value is reached, a release signal may be output. The release signal may function to release a movement of the manipulator or a movement with an increased velocity. A pressure may be detected in the pressure chamber to determine a collision. A collision may be determined when a predetermined pressure value is exceeded. When a predetermined pressure value is exceeded, a fault signal may be output. The fault signal may function to initiate an immediate stop.

The status information may relate to a workpiece, the shell, a safety status, a fault status, and/or a necessary interaction. The status information may be signaled with the aid of the light module. The status information may be signaled with the aid of a predetermined color or color combination. The status information may be signaled with the aid of a temporary light pattern. The status information may be signaled with the aid of a predetermined communication symbol.

The exchange requirement of the shell may be signaled as a function of use and/or as a function of time. A usage of the shell may include an inflation and/or a pulling back of the shell. A number of usage operations may be counted. An exchange requirement of the shell may be signaled following a predetermined number of usage operations. A number of usage operations may be compared with a predetermined threshold value. Upon exceeding the predetermined threshold value, an exchange requirement of the shell may be signaled. A duration of use of the shell may be detected. An exchange requirement of the shell may be signaled after a predetermined duration of use. A duration of use may be compared to a predetermined threshold value. Upon exceeding the predetermined threshold value, an exchange requirement of the shell may be signaled.

The shell may be uniquely identifiable. The shell may be uniquely identifiable in order to assign information to the shell, in particular usage information about the shell. The shell may be electronically and/or mechanically identifiable. The shell may have an encoded transponder. The shell may have an RFID transponder. The fastening module may have a read unit. The fastening module may function to identify the shell. The fastening module may have an RFID reader. The light module may function to identify the shell. The light module and the fastening module may be connected to one another in a signal-conducting way.

In summary and expressed in other words, a robot safety module comprising a vacuum-compressed-air airbag for robot-human interaction thus arises from the invention.

An airbag, filled using compressed air, may be provided. The airbag may completely or partially surround the most varied of end effectors or tools on a robot tool center point due to its shape. Thus, injuries or damages due to collisions with a person or with objects may be prevented or sharply reduced. The airbag may project around the tool or also around a gripper with a gripped workpiece and thus cover hard or sharp edges and form a protective buffer between the person and the tool/workpiece. A degree of hardness may be adjusted as a function of pressure. During jams, the airbag may be used as a buffer zone and/or as protection for the person. A jam may be released by discharging the air. The airbag is arranged in such a way that a tool or a tool to be joined on manipulator points is not obstructed. Cables and/or guide structures may be integrated into the airbag. Air may be removed from the airbag using vacuum. By applying excess pressure in the vacuum chambers, cylinders may be displaced in a direction that draws the guide cables so far upward that the airbag is removed from a working area and a manipulation may be carried out without interruptions.

The system may be divided into a flange and an air sack. The air sack may thereby be easily replaceable by using an airtight bayonet connection or similar quick-change couplings. The air sack may be easily and quickly exchanged following a previously defined number of activations and deactivations or a more powerful collision.

A maximum permissible number of activation and deactivation operations, up to which the safety of the system may be guaranteed, may be previously stored in an electronic system, counted by the electronic system, and compared with a threshold value. If this threshold value is reached, then either the electronic system may block the activation until a new air sack has been mounted. For this purpose, a device may be provided which recognizes whether a mounted air sack may still be used. For example, this may be carried out via an RFID tag in the air sack, which may be detected by the electronic system and which assigns a unique identity to the air sack. The electronic system may be connectable to the internet and thus has access to an external database to compare the data. The electronic system may communicate to a user, by means of a predetermined color combination using the light module, that starting immediately safety is no longer guaranteed.

The compressed air supply may be carried out via a cylinder piston which provides the necessary pressure. During the pulling back, this may, if necessary, also remove air from the air sack and apply vacuum to the same. The volume of the cylinder piston may thereby be designed such that a suitable pressure may be applied to the air sack.

To protect against sharp edges of the workpiece and gripper, a honeycomb shaped cell structure made from paper, which is thus foldable to a small size, may be arranged around the end effector. Opening and closing may be carried out by an actuator, for example, by an electromagnetic motor. Various sensors may be provided. One, which reliably monitors whether the protective device is completely opened or closed. And another sensor, which recognizes a collision with a person. A simple exchange of the safety relevant components may be carried out using a quick-change device, or a monitoring of the number of activations and the comparison with a threshold value may be carried out.

The safety module may have a light module for status projection and transmitting information. Especially when the airbag is inflated, this light module may illuminate the airbag using different colors. Colors may be, for example, red, blue, yellow, green, and mixtures of the colors. The light may additionally flash or be continuously illuminated. Status information may be: workpiece gripped or not, safety guaranteed or not, malfunction, waiting for interaction. It is additionally conceivable to use the entire surface of the airbag as a projection surface in order to display graphics, images, or the like. In addition, a tactile interface may be incorporated in the airbag. This tactile interface is preferably flexible so that the interface may follow the drawing together of the airbag when the airbag is deactivated. The tactile interface may thereby be divided into different zones or may be formed from multiple tactile buttons, so that different commands may be transmitted from the person to the robot via the tactile interface. The person may press one of the buttons, represented by the tactile sensors on the inflated airbag. These buttons may symbolize different robot, airbag, or also gripper functions; however, they may also symbolize number fields for inputting variables.

A robot safety system may have an airbag, which may additionally be illuminated in different colors via a light module. These colors may suggest different status information of the gripper. For example, whether the gripper has gripped a workpiece or not when the airbag is activated, or whether there is a malfunction of the airbag. In addition, "waiting for interaction" or the status information "safety guaranteed" may be communicated to the user via the light module. The airbag may be equipped with flexible, tactile sensors, which implement different robot, airbag, or gripper functionalities upon being pressed. For example, using the keypad, the gripper may be opened or closed, the airbag may be deactivated, the robot may be calibrated, a trajectory may be taught, or the robot may be switched to the zero-gravity mode.

The light module may have LEDs and an electronic system. The light module may be incorporated in an airbag flange. For example, an airbag illuminated in green may indicate that the safety of the entire robot system, comprising the robot and safety module, is guaranteed, the robot may be operated in a human-machine collaboration scenario, and the person may be present in the working space without the robot stopping. In contrast, a safety module illuminated in red may indicate that safety is not guaranteed, and that the person may not be present in the working space, otherwise the robot will stop. This is conceivable, for example, in case the robot is operated at different velocities. Flashing red may in turn suggest to a person that the robot is in a fault status and has been shut down due to a defect. In addition, a differentiation between continuous green illumination and flashing green may communicate to the user whether the robot has gripped a workpiece or not. Thus, whether it presently travels with or without a workpiece.

The robot of the robot system may be equipped with a torque sensor which permits an interaction with the person, so that a trajectory may be programmed into a manually guided robot.

A blue light may thereby communicate to the person that the robot is waiting for information, for example, the teaching of a trajectory or the input of a command via the user interface.

The user interface may be equipped with a keypad comprising x buttons. The buttons may function, for example, for switching to a zero-gravity mode, a robot calibration, teaching a trajectory, opening and closing a gripper, and a deactivation of the protective airbag when logging a movement sequence. The electronic system may be incorporated in an airbag flange. The airbag may be inflated for pressing the buttons. Upon pressing the zero-gravity mode button, the robot may be subsequently guided in a compliant way by hand. Upon pressing the robot calibration button, it may be suggested to the person, for example, by a flashing blue light, that the person may not subsequently touch the robot, as it is self-calibrating. A sensor offset may be determined in this phase. After pressing the button for teaching a trajectory, the robot may be subsequently guided and the corresponding trajectory is taught and recorded. Upon pressing the gripper button, the gripper may open or close, depending on which state it is currently in. After pressing the airbag deactivation button, the airbag may be deactivated.

Safety is increased using the invention. Risk of injury is reduced. A risk of damage is reduced. Intersecting working areas of the person/robot are enabled. A working velocity is increasable. Expenses, like costs, construction costs, sensor costs, and/or computing costs, are reduced. Erroneous triggers of protective systems are prevented. Protection from an effector is enabled. Protection from an effector and from a workpiece located on the effector is enabled. Human-robot collaboration is improved. In the case of a protected effector, an effector status may also be signaled. Production is improved. Collision protection is provided even in the case of a defect in one chamber. In the case of a defect in one chamber, a repair may be carried out in a simplified way. The pressure spaces of the shell may be fillable and/or evacuable independently from one another.

Embodiments of the invention are subsequently described in greater detail with reference to the figures. Additional features and advantages arise from this description. Specific features of these embodiments may represent general features of the invention. Features of these embodiments combined with other features may also represent individual features of the invention.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
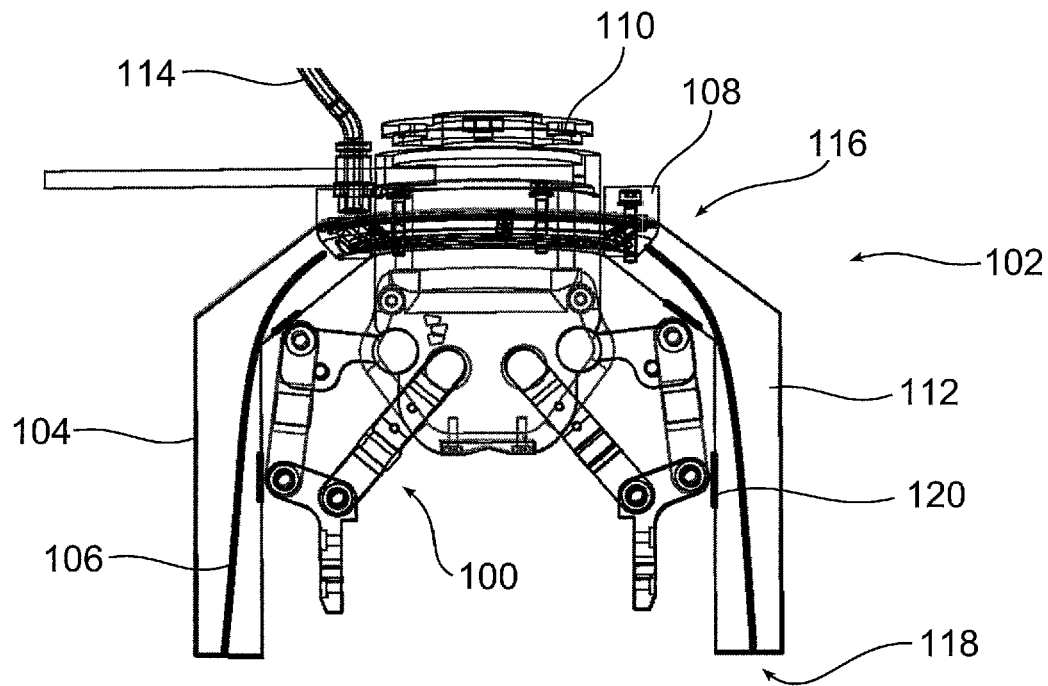
FIG. 1 depicts a gripper for an industrial robot with an exemplary protective device comprising a shell and elastic pulling means.

FIG. 1 shows a gripper 100 for an industrial robot with a protective device 102 comprising a shell 104 and elastic drawing means, such as 106. Protective device 102 functions to protect a person, cooperating with the industrial robot in its working area, from gripper 100 and, if necessary, from a gripped workpiece.

Protective device 102 has an annular fastening section 108 for fastening on gripper 100. Gripper 100 has a connection flange 110 for connecting to a corresponding connection flange of an industrial robot. Protective device 102 is fastened using its fastening section 108 on gripper 100 in the proximity of connection flange 110.

Shell 104 is flexurally slack and bounds a fillable and/or evacuable pressure space 112. An air distribution duct is arranged in fastening section 108. Pressure space 112 and the air distribution duct are communicatively connected to one another. An air hose 114 is arranged on fastening section 108. Air hose 114 is communicatively connected to the air distribution duct. Pressure space 112 may be filled with air and/or air may be evacuated from pressure space 112 via air hose 114 and the air distribution duct.

Shell 104 has a rigid end section 116 tightly connected to fastening section 108 and a free end section 118. Elastic pulling means 106 are arranged in pressure space 112. Presently, pulling means 106 are designed as elastic rubber bands. Pulling means 106 respectively have a high-tensile connection to fastening section 108 on one end and a high-tensile connection to shell 104 at free end section 118 at another end. At areas which contact gripper 100 when pressure space 112 is filled, shell 104 has reinforcing elements, such as 120. Reinforcing elements 120 are presently produced from a plastic material.

Figure 2:
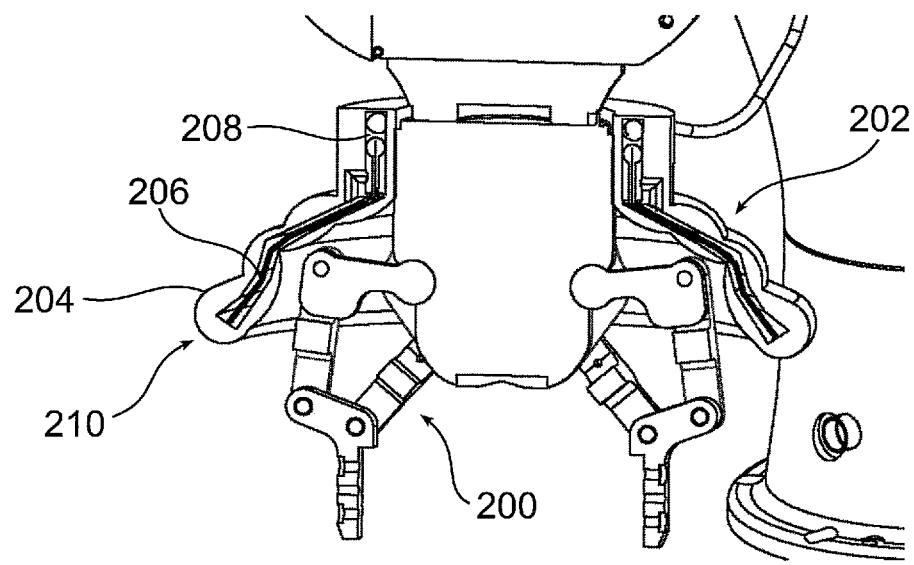
FIG. 2 depicts a gripper for an industrial robot with another exemplary protective device comprising a shell, pulling means, and actuators.

FIG. 2 shows a gripper 200 for an industrial robot with a protective device 202 comprising a fillable and/or evacuable shell 204, pulling means, such as 206, and actuators, such as 208. Pulling means 206 respectively have a high-tensile connection to an actuator 208 on one end and a high-tensile connection to shell 204 at free end section 210 at another end. Presently, pulling means 206 have a low elasticity and function to transfer tensile forces from actuators 208 to shell 204. Actuators 208 function to apply a tensile force to pulling means 206 and each has a pneumatically-actuable piston-cylinder arrangement. For the rest, reference is supplementally made in particular to FIG. 1 and the associated description.

Figure 3:
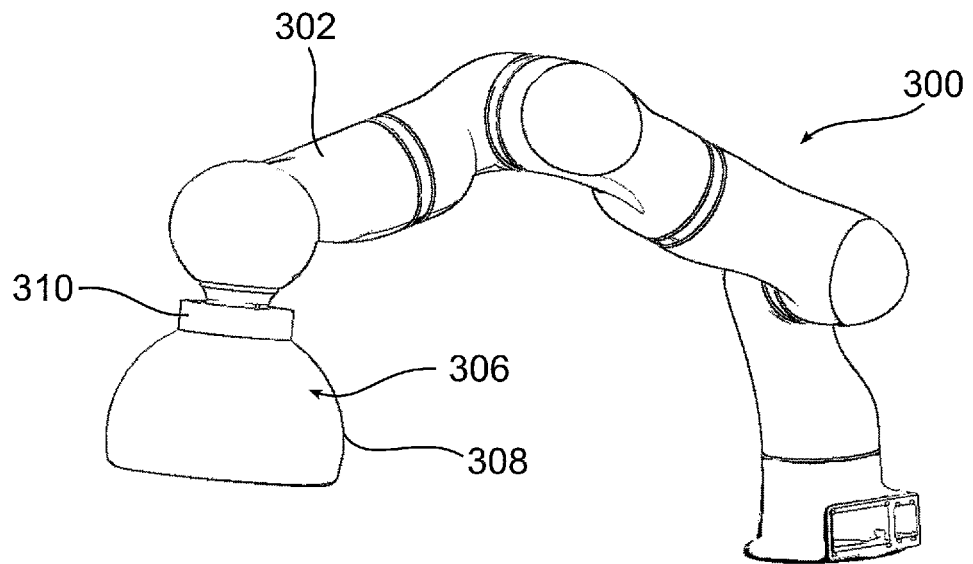
FIG. 3 depicts an industrial robot with a gripper and an exemplary protective device in an inflated state.
Figure 4:
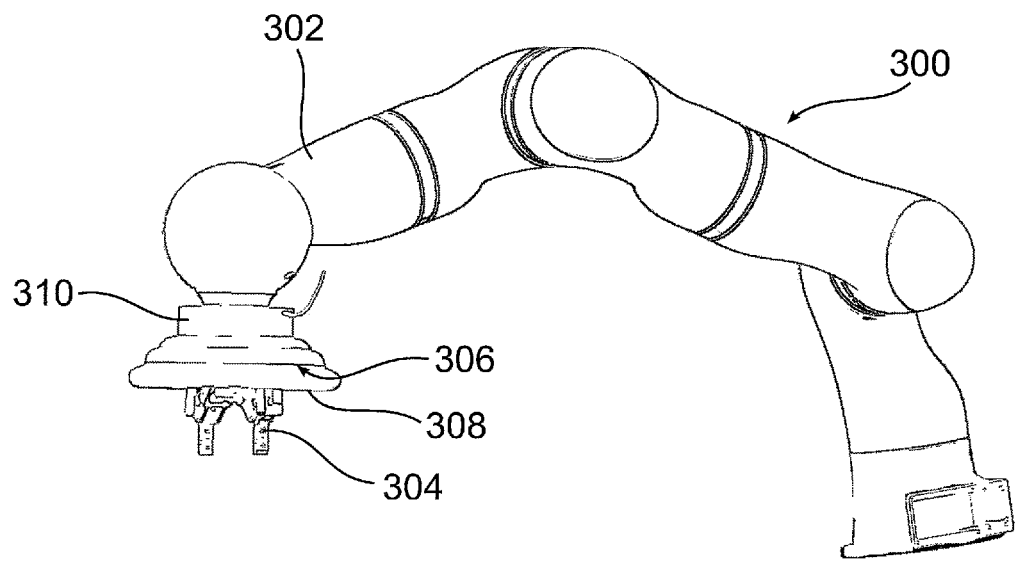
FIG. 4 depicts the industrial robot with a gripper of FIG. 3 with the protective device in a pulled back state.

FIG. 3 shows an industrial robot 300 comprising a manipulator 302, a gripper 304, and a protective device 306, like protective device 102 according to FIG. 1 or protective device 202 according to FIG. 2, in the inflated state. FIG. 4 shows industrial robot 300 with protective device 306 in the pulled back state. When the pressure space is filled, shell 308 is inflated and surrounds gripper 304 like a hood, as shown in FIG. 3. When the pressure space is evacuated, shell 308 is pulled back and is arranged folded together like a round cup at fastening section 310 of protective device 306, as is shown in FIG. 4. During operation of industrial robot 300, shell 308 is drawn back if a workpiece is to be picked up or deposited with the aid of gripper 304, and is inflated if manipulator 302 with gripper 304 is moved with or without a workpiece. Drawing back the shell 308 is supported by the pulling means and, if necessary, the actuators. For the rest, reference is supplementally made in particular to FIG. 1 and FIG. 2 and the associated description.

Figure 5:
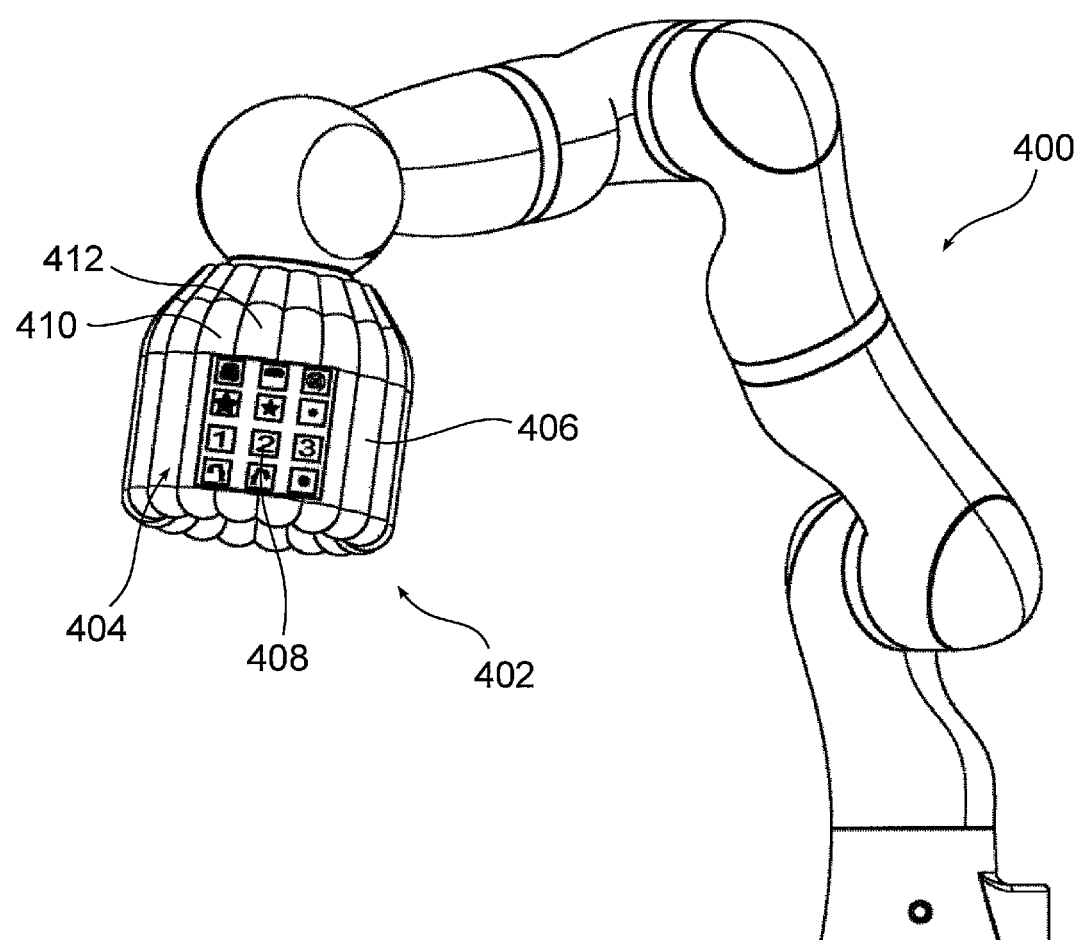
FIG. 5 depicts an industrial robot with a gripper and an exemplary protective device comprising an information technology user interface.

FIG. 5 shows an industrial robot 400 comprising a gripper and a protective device 402 for an effector with an information technology user interface 404. User interface 404 functions both for information output and also for information input.

Shell 406 has multiple chambers, such as 410, 412. Chambers 410, 412 are separated fluid-tight from one another and form pressure spaces separated from one another. In the case of a defect, in particular damage and/or leakage of individual chambers 410, 412, a basic safety level is maintained. Chambers 410, 412 may be individually exchanged or repaired.

Protective device 402 has a light module for information output. The light module is arranged inside of shell 406. Shell 406 is produced from a translucent material. Shell 406 is illuminable from the interior with different colors with the aid of the light module. Thus, for example, status information, like a safety state, a fault, or a necessary interaction may be signaled.

Protective device 402 presently has a touchpad 408 for information output [sic]. Touchpad 408 is arranged on the exterior on shell 406 and is fixedly connected to shell 406. Touchpad 408 is flexible in such a way that shell 406 with touchpad 408 may be pulled back from the effector. Touchpad 408 presently has symbols and numerals.

For the rest, reference is supplementally made in particular to FIG. 1 and FIG. 2, to FIG. 3 and FIG. 4, and the associated description.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE NUMERALS

100 Effector, gripper
102 Protective device
104 Shell
106 Drawing means
108 Fastening section
110 Connection flange
112 Pressure space
114 Air hose
116 End section
118 End section
120 Reinforcing element
200 Effector, gripper
202 Protective device
204 Shell
206 Drawing means
208 Actuator
210 End section
300 Industrial robot
302 Manipulator
304 Effector, gripper
306 Protective device
308 Shell
310 Fastening section
400 Industrial robot
402 Protective device
404 User interface
406 Shell
408 Touchpad
410 Chamber
412 Chamber

What is claimed is:

1. A system, comprising:
a robotic manipulator having an end effector; and
a protective device coupled with the end effector of the robotic manipulator, the protective device comprising a flaccid shell having a first end and an oppositely disposed second end, the second end movable in directions toward and away from the first end;
the first end of the shell coupled proximate the end effector of the robotic manipulator by a fastening section adapted to connect to the end effector or to a connection flange of the robotic manipulator for receiving the end effector;
the shell convertible to and between a first, deployed configuration and a second, retracted configuration;
wherein the second end of the shell is extended away from the first end to envelop at least the end effector in the first configuration;
wherein the second end of the shell is drawn away from the end effector and in a direction toward the first end in the second configuration;
the protective device further comprising at least one pulling member operatively coupled with the shell;
the at least one pulling member cooperating with the shell to move the shell to and between the first and second configurations;
wherein the at least one pulling member maintains the shell in the second, retracted configuration during operation of the end effector to pick up or deposit a workpiece, and the shell is extended to the first configuration during a movement of the robotic manipulator to protect against collisions.

2. The system of claim 1, wherein the at least one pulling member is in a tension-released state in the first configuration of the shell.

3. The protective device of claim 1, further comprising:
at least one actuator operatively coupled with the at least one pulling member;
the at least one actuator cooperating with the at least one pulling member to move the shell from the first configuration to the second configuration.

4. The protective device of claim 1, further comprising an information technology user interface adapted to at least one of receive input information or output information.

5. A protective device for an end effector of a robotic manipulator, the protective device comprising:
a flexurally slack shell having a first end and an oppositely disposed second end, the second end movable in directions toward and away from the first end;
the first end of the shell couplable proximate the end effector of the robotic manipulator;
the shell convertible to and between a first, deployed configuration and a second, retracted configuration;
wherein the second end of the shell is extended away from the first end to envelop at least one of the end effector or the end effector and a workpiece supported by the end effector in the first configuration;
wherein the second end of the shell is drawn away from the end effector and in a direction toward the first end in the second configuration;
at least one pulling member operatively coupled with the shell;
the at least one pulling member cooperating with the shell to move the shell to and between the first and second configurations;
wherein the at least one pulling member comprises:
a first section coupled with the second end of the shell, and
a second section operatively connected with the first section,
the second section exhibiting a greater elasticity than the first section, such that the first section is operable to transmit a tensile force to the shell for moving the shell from the first configuration to the second configuration.

6. The protective device of claim 5, wherein the second section of the pulling member comprises an elastic band for providing the greater elasticity.

7. The protective device of claim 5, wherein the second section of the pulling member comprises a spring for providing the greater elasticity.

8. A protective device for an end effector of a robotic manipulator, the protective device comprising:
a flexurally slack shell having a first end and an oppositely disposed second end, the second end movable in directions toward and away from the first end;
the first end of the shell couplable proximate the end effector of the robotic manipulator;
the shell convertible to and between a first, deployed configuration and a second, retracted configuration;
wherein the second end of the shell is extended away from the first end to envelop at least one of the end effector or the end effector and a workpiece supported by the end effector in the first configuration;
wherein the second end of the shell is drawn away from the end effector and in a direction toward the first end in the second configuration;
at least one pulling member operatively coupled with the shell;

the at least one pulling member cooperating with the shell to move the shell to and between the first and second configurations;

wherein:

the shell defines at least one pressure space, the shell is configured to move to the first configuration in response to the pressure space being exposed to a pressure source, and the shell is configured to move to the second configuration when the pressure space is evacuated.

9. The protective device of claim 8, further comprising a pressure source communicating with the pressure space for supplying pressurized fluid to the pressure space in the first configuration of the shell.

10. A method for actuating a protective device for an end effector of a robotic manipulator, the protective device comprising a flaccid shell having first end coupled proximate the end effector and a second end that is movable toward and away from the first end, and at least one pulling member, the at least one pulling member including a first section coupled with the second end of the shell and a second section operatively connected with the first section and exhibiting a greater elasticity than the first section, the method comprising:

placing the shell in a first configuration wherein the second end of the shell is extended away from the first end to envelop at least the end effector in response to at least one of:

a sensed collision of the end effector with an object, or movement of the end effector by the robotic manipulator other than a movement to pick up or deposit a workpiece with the end effector.

11. The method of claim 10, wherein placing the shell in a first configuration comprises at least one of:

releasing a tensile force in the at least one pulling member; or exposing a pressure space of the shell to a pressure source.

12. The method of claim 10, further comprising:

moving the shell from the first configuration to a second configuration wherein the second end of the shell is drawn away from the end effector in a direction toward the first end.

13. The method of claim 12, wherein moving the shell from the first configuration to the second configuration comprises at least one of:

applying a tensile force to the second end of the shell with the at least one pulling member; or evacuating a pressure space of the shell.

14. The method of claim 10, further comprising at least one of:

filling at least one pressure space of the shell and releasing the at least one first pulling member in response to a manipulation of a workpiece by the robotic manipulator not being scheduled; or evacuating the at least one pressure space and applying a tensile force to the at least one pulling member in response to a manipulation of a workpiece being scheduled.

* * * * *